United States Patent [19]

Cronin et al.

[11] 4,417,312
[45] Nov. 22, 1983

[54] ELECTRONIC CONTROLLER FOR VALVE ACTUATORS

[75] Inventors: Gerald F. Cronin, Worcester; Howard J. Fuller, Shrewsbury, both of Mass.

[73] Assignee: Worcester Controls Corporation, West Boylston, Mass.

[21] Appl. No.: 271,306

[22] Filed: Jun. 8, 1981

[51] Int. Cl.³ .............................................. G05B 11/00
[52] U.S. Cl. .................................... 364/510; 318/599; 318/612; 364/166; 364/174; 364/183; 251/129
[58] Field of Search ............... 364/130, 167, 174, 175, 364/176, 183, 400, 509, 510, 166; 318/599, 592, 594, 611, 612, 685, 696; 251/129-136

[56] References Cited

U.S. PATENT DOCUMENTS

| | | | |
|---|---|---|---|
| 3,304,480 | 2/1967 | Ko | 364/510 X |
| 3,874,407 | 4/1975 | Griswold | 251/129 X |
| 3,995,208 | 11/1976 | Parr | 318/612 |
| 4,112,342 | 9/1978 | Elliott | 318/599 |
| 4,236,106 | 11/1980 | Davis et al. | 318/599 |
| 4,258,301 | 3/1981 | Kawa | 318/599 X |
| 4,259,626 | 3/1981 | Nomura et al. | 318/599 |

*Primary Examiner*—Joseph F. Ruggiero
*Attorney, Agent, or Firm*—Pollock, VandeSande & Priddy

[57] ABSTRACT

An electronic controller is provided to control the energization of an electrical actuator to readjust a valve which controls the flow of a fluid in a controllable process. The controller is responsive to two signals, one of which is produced by a process sensor to represent the instantaneous magnitude of a predetermined process parameter and the second of which constitutes a set signal representative of a desired magnitude of the parameter. The signals are compared, and the sense of any resulting error signal is used to control the direction of movement of the actuator while the instantaneous magnitude of the error signal, during a succession of equal time intervals, is used to control the rate of movement of the actuator by controlling the extent of movement of the actuator during each of the time intervals. The actuator is jointly responsive to these two controls and moves in a series of incremental steps, the sizes of which decrease exponentially to match the process loop variable's exponential change with time, as the error signal reduces to zero.

14 Claims, 6 Drawing Figures

ELECTRONIC CONTROLLER FOR VALVE ACTUATORS

BACKGROUND OF THE INVENTION

Process control systems customarily comprise a multiplicity of individual control loops, each of which is an independent entity, which are interrelated to one another by means of a central processor. A typical control loop of the type suggested heretofore consists of a sensor, a signal transmitter, a set-point controller, a positioner, an actuator, and a valve.

The set-point controller is a comparatively expensive device the cost of which depends upon the number of modes of operation which are provided, the capability within each mode, and the overall capability and sensitivity of the controller. It functions to compare a signal which is derived from a loop sensor with another signal that represents a quantitative control setting that has been input either manually or from a central system processor. The relationship between the inputs and output of the set-point controller is ordinarily complex and variable, the complexity being a function of the number of modes which the controller is capable of bringing into computational capability, and the variability of the relationship being due to the rangeability, response, and ease of adjustment of each mode. The set-point controller responds to a discrepancy between the input signals thereto, to compute and transmit to the valve positioner a new valve setting which will reduce the discrepancy to zero. The output of the set-point controller is ordinarily a signal of fixed magnitude which represents a new valve position to which the valve should be set as quickly as possible to eliminate the discrepancy between the input signals to the set-point controller. The new valve position is normally transmitted to the positioner in the form of a standardly accepted voltage or current signal used in process control loops (typically a 4–20 ma dc signal or a 0 to 5 volts dc signal).

The valve positioner converts the output signal from the set-point controller, typically a 4–20 ma dc current signal, into a discrete valve position. To do this, the valve positioner converts the 4 to 20 ma current signal to a voltage signal, and then compares that voltage signal to a voltage which is derived from a potentiometer driven by the actuator output shaft. Any difference between these two voltage signals causes the actuator motor to be energized to rotate the shaft until the difference is reduced to zero, thereby changing the valve opening. With the new valve setting, the change in media flow causes the sensor output to change in a direction which matches the quantitative control setting at the set-point controller. As the sensor output varies with changing flow, the set-point controller constantly computes and transmits new valve positions to the positioner until a final position is reached when the output of the sensor matches the quantitative control input.

In general, the valve positioner is a linear device, i.e., equal increments of the input signal thereto cause the output shaft of the actuator to change in equal increments. A few options are customarily available in these known systems, e.g., electronic braking, and duty cycle and/or hunting control.

The lowest cost controllers presently available are usually single mode controllers with limited adjustment within that mode, while the highest cost controllers are usually three-mode controllers with each mode being highly variable and with little interaction between the adjustments. Regardless of the name given to each mode, it constitutes primarily a timing circuit and an associated analog decision circuit which cooperate to determine when and for how long a particular mode function will be activated each time a control action is required of the set-point controller. The controller normally operates in accordance with a plurality of algorithms which determine when, how long, and how fast various parameters should be combined in a mode function, and the controller is tuned by adjustment of these parameters to achieve a desired response in a control loop and to minimize loop upsets by matching the controller's response to the inherent dynamics of a particular process loop. In any event, known set-point controllers are normally extremely expensive pieces of equipment, with a large portion of the costs of the controller being attributable to the type of circuitry employed therein, i.e., analog circuits which operate on infinitely small input voltage variations and which tend to be very critical of component selection and circuit gain and balance adjustments and which, over the normal life of the controller, are subject to drift due to temperature, voltage and humidity variations and component deterioration whereby the finely tuned set-point controllers typically employed heretofore required constant observation and maintenance to maintain high loop control efficiency.

The present invention is directed to an improved controller which is far simpler and less costly than set-point controller/positioner combinations suggested heretofore, but which nevertheless can provide a desired process control function reliably and accurately. In contrast to set-point controller/positioner combinations suggested heretofore, the system of the present invention eliminates the need for a valve positioner and, instead, provides an output signal which is used directly to control the valve actuator. In addition, in contrast to the prior art systems described above, which operate to produce a signal that designates a specific position to which the valve used in a process control loop should be set, the system of the present invention operates in accordance with an entirely different and unique philosophy, i.e., the system simply monitors the magnitude of a particular parameter in the process control loop, compares it to a specified value which that parameter should have, and actuates the valve to cause a change in a flowing fluid medium while the parameter continues to be monitored until such time as the parameter being monitored reaches the specified or desired value. In short, the system of the present invention does not concern itself with valve position. Instead, the system of the present invention operates, without regard to the existing valve position, to cause the valve to move in the proper direction and at a proper rate needed to provide corrective flow action, with said corrective flow action being accomplished slowly enough so as not to inject process disturbances, but fast enough so that the corrective action does not always lag behind a required flow change.

Since the system of the present invention does not concern itself with valve position per se, there is no need for a position feedback in the actuator, or with a positioner which provides a position comparison function. Moreover, since valve position is disregarded in the present invention, the complex mode functions which have typically been employed in controllers heretofore, and which function simply to modify an originally designated position when the controller compares the sensor input to the set-point input, can be eliminated. The resultant circuit which characterizes the present invention is accordingly far less costly than controllers which have been suggested heretofore, and can be made in such small sizes that, although the controller can be located at a position remote from the actuator as has been the case heretofore, it can also, if desired, be mounted directly adjacent the actuator or incorporated into the actuator housing.

SUMMARY OF THE INVENTION

The present invention, having the reduced cost and simplifications described above, comprises an electronic circuit which responds to a pair of input signals, representative respectively of the instantaneous magnitude of a process parameter being monitored and of a desired magnitude of said parameter, to produce an error signal which is processed to move a valve actuator in an appropriate direction and at an appropriate rate needed to reduce the error signal to zero with minimum process disturbances. The system operates to produce a train of power pulses which are applied during successive time intervals to the actuator, to cause the actuator to move in a series of incremental steps. The occurrence of an error signal causes the actuator to move; the sense or polarity of the error signal is used to determine the direction in which the actuator moves; and the instantaneous magnitude of the error signal during each of a succession of substantially equal time intervals is used to control the rate of movement of the actuator by changing the time duration during which power is applied to the actuator motor and, more specifically, the time duration of each power pulse which is applied to the actuator motor. By reason of these controls, the actuator motor is caused to move in a series of incremental steps the sizes of which correspond respectively to the instantaneous magnitude of the error signal during each of a plurality of successive time intervals so that, as the magnitude of the error signal reduces toward zero, the size of each step of movement of the actuator similarly decreases during each of a succession of time intervals.

The sizes of the actuator steps preferably vary exponentially to substantially match the time constant of the process being controlled. As a result, the process is controlled with a minimum overshoot and with a minimum instability in the process variable. The controller of the present invention is provided with adjustments which can be used to achieve this result. In addition, the controller of the present invention is adapted to respond to a condition wherein the error signal has been reduced to zero, to generate a braking pulse which is applies to the actuator motor or bring the motor to a full stop when the parameter being monitored is at the command value.

BRIEF DESCRIPTION OF THE DRAWINGS

The foregoing objects, advantages, construction and operation of the present invention will become more readily apparent from the following description and accompanying drawings wherein.

DESCRIPTION OF THE PREFERRED EMBODIMENTS

The present invention is concerned with an electronic controller that can be used to monitor and adjust a parameter in a process control loop. The parameter can be fluid flow, fluid volume, temperature, level, pressure, concentration, conductivity, pH, or any other process variable whose value depends on or can be adjusted by the flow or variation in flow of a liquid or gaseous fluid. Typically, in both the prior art and in the present invention, a particular parameter of interest is monitored, a desired value of that parameter is separately established, and these two values are used together to vary the flow of a fluid medium so as to eliminate any discrepancy between these two values. For example, if the parameter is flow per se, the quantity of flow is increased or decreased as necessary; if the parameter is temperature, more or less flow of a hot or cool fluid is provided to maintain a desired temperature; if the parameter is pH, the flow of an acidic or basic fluid is adjusted as may be necessary, etc.

Figure 1:
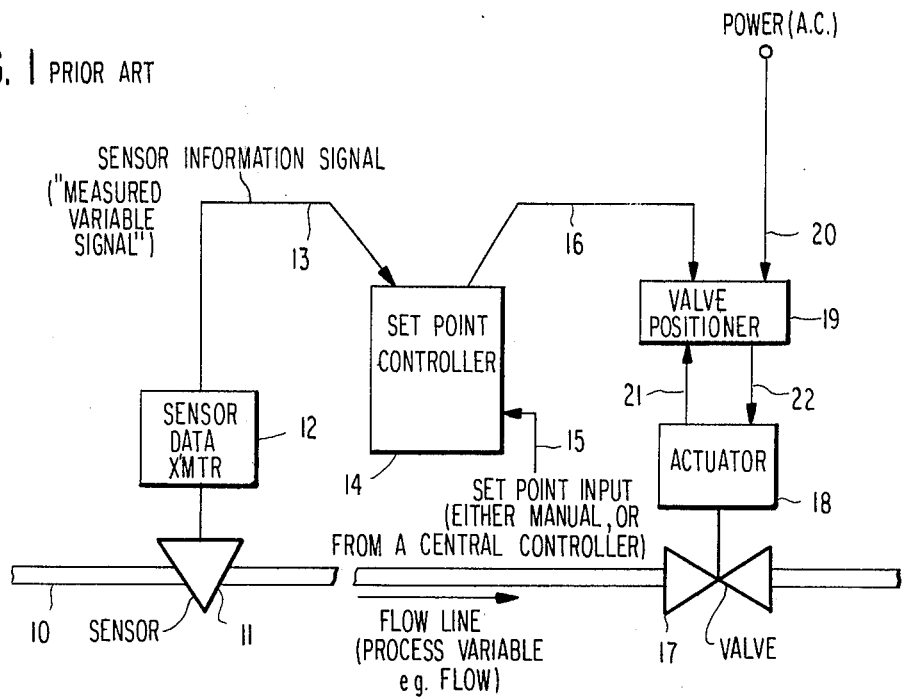
FIG. 1 depicts in block diagram form a process control arrangement of the prior art type.

FIG. 1 illustrates a typical process control loop of the prior art type. The flowing medium may pass, for example, through a pipeline 10 which has a sensor 11 therein that is used to monitor the particular parameter of interest in that loop. The sensor 11 is associated with a data transmitter 12 which supplies a measured variable signal on a line 13 comprising one input to a set-point controller 14. The set-point controller is, as previously described, a comparatively expensive and complicated device, and it is provided with a set-point input 15 which inputs a signal that is representative of a desired parameter value for the process variable being monitored. The set point input 15 can be supplied manually be an operator who is simultaneously monitoring various gauges or the like forming a portion of the overall control equipment and/or it can be provided automatically from a central controller. In either case, any difference between the signals that are supplied at inputs 13 and 15 are processed by the set-point controller 14 in accordance with predetermined algorithms to provide a control signal at output 16 which ultimately commands a valve 17 in line 10 to move to a new position, uniquely determined by the magnitude of the output signal on line 16, which will reduce the discrepancy between the signals at set-point controller inputs 13 and 15.

Valve 17 is normally respositioned by an actuator 18 under the control of a valve positioner 19 which is energized at 20 and which responds to the command signal on line 16 as well as to a valve position feedback signal supplied by the actuator on line 21 to produce an error signal, which powers the actuator, on line 22. Actuator 18 repositions valve 17 under the control of the command signal applied to valve positioner 19 until the error between the command signal on line 16 and the valve position feedback signal supplied by the actuator on line 21 is reduced to zero.

The signal which is provided on line 16 at the output of the set-point controller 14 is typically a 4 to 20 ma signal that represents a shaft position for actuator 18. That signal can be calibrated in various systems to mean anything from a fully closed to a fully open valve, or a range of possible valve positions, e.g., starting at a minimum of 20% open to a maximum of 80% open. In either case, the output of the set-point controller represents a finite position command signal which is interpreted by the valve positioner 19 as a specific valve position, and valve positioner 19 then causes a readjustment of valve 17 by means of actuator 18 until the error between the command signal on line 16 and the valve position feedback signal supplied by the actuator on line 21 reduces to zero.

Figure 2:
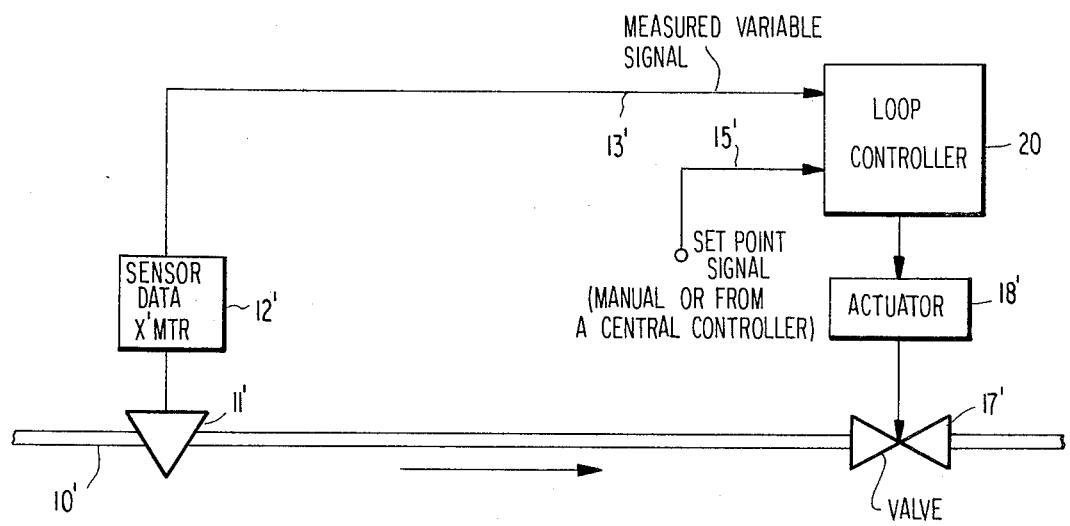
FIG. 2 illustrates in block diagram form a simplified process control loop which can be formed by use of the present invention.

The simplified system of the present invention is shown in FIG. 2. Again the system includes a pipeline 10', a sensor 11', a data transmitter 12' providing a measured variable signal on line 13', a valve 17', and an actuator 18'. The system of the present invention does not employ a set-point controller 14 and a valve positioner 19 of the type shown in FIG. 1, however, and instead employs a loop controller 20, taking the form shown diagrammatically in FIG. 4 and schematically in FIGS. 5A and 5B, to energize actuator 18' and thereby reposition valve 17' until the measured variable signal at input 13' to the loop controller corresponds to a set point signal 15' which is also provided as an input to the loop controller. In the system shown in FIG. 2, the positioning of the actuator 18' is not controlled by any feedback signal provided by a valve positioner such as 19, nor is the actuator 18' moved at a linear rate (as in FIG. 1) to reduce any error signal resulting from a discrepancy between the inputs 13' and 15' to the loop controller 20. Instead, as will be described more fully hereinafter, the actuator 18' in the system of the present invention moves in step increments with the size of each increment being proportional to the instantaneous magnitude of an error signal generated in loop controller 20, and with the size of each of the incremental steps therefore becoming smaller and smaller as said error signal reduces toward zero, wherefore the actuator 18' describes a varying speed of motion which decreases exponentially as the error signal approaches zero.

Figure 3:
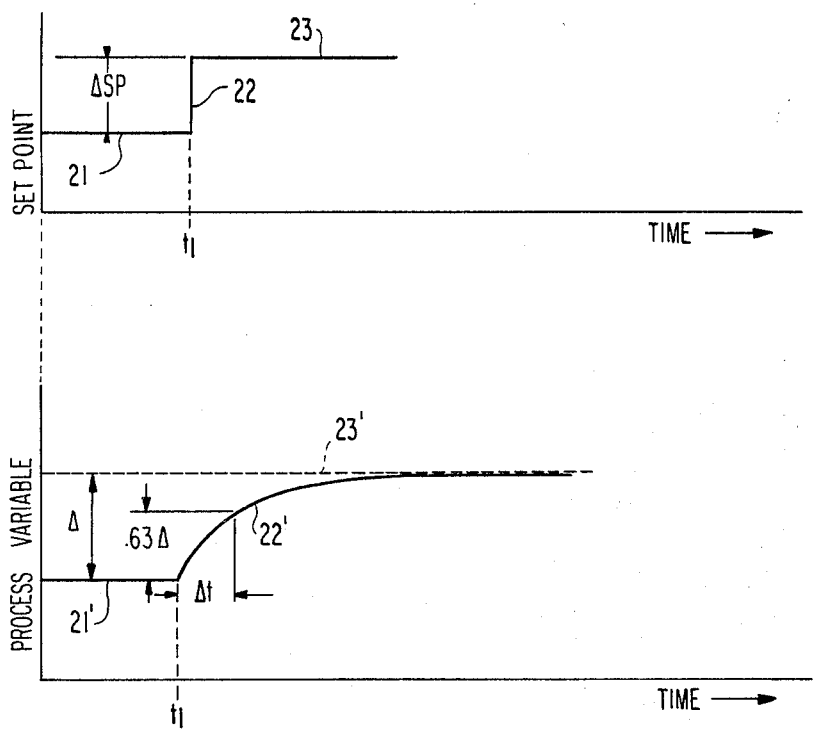
FIG. 3 comprises a pair of curves which illustrate certain operating aspects of the systems shown in FIGS. 1 and 2.

The rate of movement of the actuator 18' is effected in the present invention in a manner which substantially matches the type of change that occurs in the process being controlled, i.e., the rate of movement of the actuator substantially matches the time constant of the process. This aspect of the invention will become more readily apparent from consideration of the curves shown in FIG. 3.

In a typical process control system, e.g., of the types shown in FIGS. 1 and 2, a set point input signal having a fixed value 21 (see the upper curve) will achieve a magnitude 21' of process variable. If at a time $t_1$ there should be a change in the value of the set point signal, e.g., as indicated at 22, the process variable will also change. However this change will not be a step function corresponding to 21, 22 and, instead, the change will occur over a finite period of time along a curve 22' as the magnitude of the process variable asymptotically approaches a new value 23' which corresponds to the new value 23 of the set point. The time $\Delta t$ which the process requires to achieve 63% of the total change in process variable is known as the time constant of the process. If this time constant is disregarded, and if the process variable is changed in a manner or along a curve which differs significantly from the exponential curve 22' shown in FIG. 3, the actuator may move so slowly that it never achieves a desired final value of process variable, or it may move so quickly that it tends to overshoot the final value with the result that the actuator and valve tend to hunt about the final desired value. The present invention takes this matter into consideration by causing the actuator to move in a fashion which follows the exponential curve 22' with respect to time, i.e., the rate of movement of the actuator substantially matches the time constant of the process being controlled with the controller being provided with appropriate adjustments to permit this matching to be achieved during a set-up operation. In this way, the controller of the present invention achieves reliable process control with a minimum of overshoot and/or instability in the process variable, and does so by means of an arrangement which is far simpler and less costly than the arrangements which have typified the set-point controller and valve positioner combinations suggested heretofore.

Figure 4:
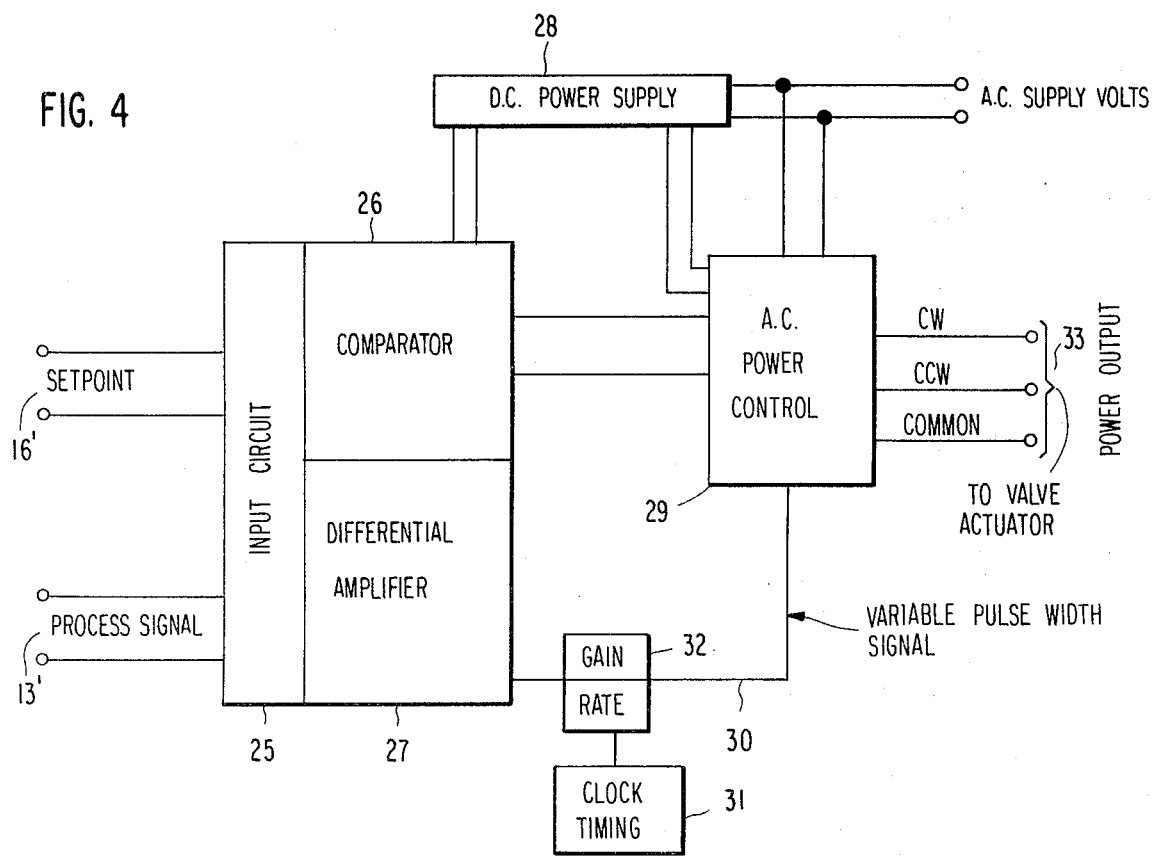
FIG. 4 is a block diagram of an electronic controller constructed in accordance with the present invention.

The electronic controller of the present invention is shown in block diagram form in FIG. 4. It comprises a circuit which receives a measured variable signal at an input 13', taking the form for example of a current or voltage signal, typically a 4–20 ma dc signal or a 0–5 volt dc signal, and a set-point signal at an input 16' which again can comprise either a current or a voltage signal as above. These two signals are applied to an input circuit 25 forming a portion of the controller, and are supplied by circuit 25 to a comparator 26 and a differential amplifier 27 in the circuit. The controller is further associated with a dc power supply 28 which supplies power to the components comprising portions 25–27 of the circuit as well as to an ac power control 29. The ac power control 29 is further controlled by a variable pulse width signal which is generated on a line 30 by means of a clock circuit 31 associated with gain and rate controls 32 that are coupled to differential amplifier 27. The AC power control selectively energizes the clockwise (CW) or counterclockwise (CCW) power inputs of an electrically powered valve actuator or power inputs of an electrically powered solenoid operator to a pneumatic actuator. The actuator 33 is in itself a commercially available device, comprising for example a model 73 or model 75 electric actuator or a model 39 pneumatic actuator; both types of actuator are available from Worcester Controls Corporation of West Boylston, Mass. The electric actuator, model 73 or 75, uses a permanent split capacitor motor having two power inputs and a common wire. Energizing one of these power inputs and the common causes the motor to rotate in one direction, while energizing the other power input and the common causes the motor to rotate in the opposite direction. Therefore, selectively energizing either one or the other power input and the motor common allows the motor to rotate clockwise or counterclockwise. Similarly, a commercially available solenoid operator has two distinct solenoid coils which allow, by their separate energization, the movement, either clockwise or counterclockwise of a pneumatic actuator.

The input circuit 25, cooperating with the comparator 26 and differential amplifier 27, determines the valve operator's movement to correct the process. When the process deviates from its set point as noted by the controller because of a deviation between the process input signal at 13' and the set point signal at 16', the electronic circuitry, namely the comparator 26 and the differential amplifier 27, determine whether the valve should move, in what direction it should move, how fast it should move, and how long it should move in order to correct the process so that the process signal at 13′ becomes equal to the set point signal at 16′. More particularly, input circuit 25 generates an error signal when there is a difference between the two inputs to said input circuit; the comparator circuit 26 determines from the existence and sense of this error signal whether the valve should move and its direction of movement; and the differential amplifier 27 responds to the instantaneous magnitude of the error signal, caused by the differences between the process signal 13′ and the set point signal 16′ to determine the average speed of valve movement, and when the process is satisfied, i.e., the signal at 13′ and 16′ are equal, the controller has determined the number of degrees of valve movement. It should be noted in this respect that inasmuch as these components of the controller are responsive to the instantaneous sense and magnitude of the differences between the process signal 13′ and the set point signal 16′ the controller of the present invention is immediately responsive to all changes in the input signals. The prior art arrangement of FIG. 1 operated to move the valve to a new position to try and satisfy the process. Depending on valve and process loop characteristics, the new valve position most likely overcorrected the process. Process oscillations would begin until the process change was stabilized. The system of the present invention disregards actual valve position at any given time and responds to correct the process until the process signal of 13′ and the set point signal of 16′ are equal.

The differential amplifier 27 is a specially designed circuit which provides an equal voltage output signal at either side of the process loop variable's set point, i.e., it provides the same voltage output signal if the process is deviated an equal amount either above or below the set point. A final stage of amplification generates a control voltage signal that is proportional to this error, i.e., to the deviation from the set point. The amount of this control voltage signal, proportional to the error, can be adjusted in this final stage of amplification by means of the gain set in component 32.

The voltage from the aforementioned final stage of amplification is fed into a timing circuit 31 which controls the speed with which the actuator will respond to a given error. The timing circuit senses the magnitude of the control voltage and allows the actuator to turn on for a time period proportional to the magnitude of the control voltage. As this voltage decreases, the "time-on" of the actuator, i.e., the actuator speed, decreases in an exponential fashion as the process variable returns to the set point. As will become apparent from the subsequent discussion of FIGS. 5A and 5B, the clock circuit 31 includes a pulse-width adjustment which allows a wide adjustment range of exponential speed changes, whereby the correction signal to the final control element can be adjusted to match the process variable's time constant.

All corrective action by the circuit takes place within a predetermined clock period which is set by the clock timer. Once the circuit senses that the process variable is at the set point, the comparator circuit 26 inhibits further motion of the actuator by preventing the further application of power pulses to the actuator motor, and by providing a momentary brake pulse to the actuator motor to minimize position overshoot from rotor inertia of the motor.

As will become apparent from later discussion, the control circuit includes an anti-hunt control to inhibit momentary action of the actuator motor. Adjustment of the input signal's "null-deadband" determines the controller's hysteretic response (i.e., the amount of opposite polarity signal needed to make the control element reverse direction) thereby minimizing "null-point" hunting. A span and zero adjustment are also provided to allow an adjustment of the set point control to match the range of the process variable's signal coming into the control circuit. Light emitting diodes are also provided to give an indication of the set point, the direction of rotation, and the occurrence of the momentary brake pulse.

The controller shown in FIG. 4, and used in a system of the type shown in FIG. 2, replaces the set-point controller and valve positioner which have been typically employed in the past. The resultant system significantly reduces cost and space requirements, and provides more reliable control to the process loop variable. More particularly, the controller of the present invention provides better control to the process loop variable since it seeks to minimize the difference between the process set point and the process variable, in contrast to the quite different approach which has been used heretofore wherein the final control element commands a specific new valve position upon occurrence of a difference between the set point and process variable signals. In allowing the final control element to minimize the difference between the process set point and the process variable, the controller of the present invention allows the valve element to move in a fashion which will correct any deviation in a manner which is matched to the capability of the process variable, i.e., the process time constant, thereby giving more reliable control of the process loop.

Figure 5A:
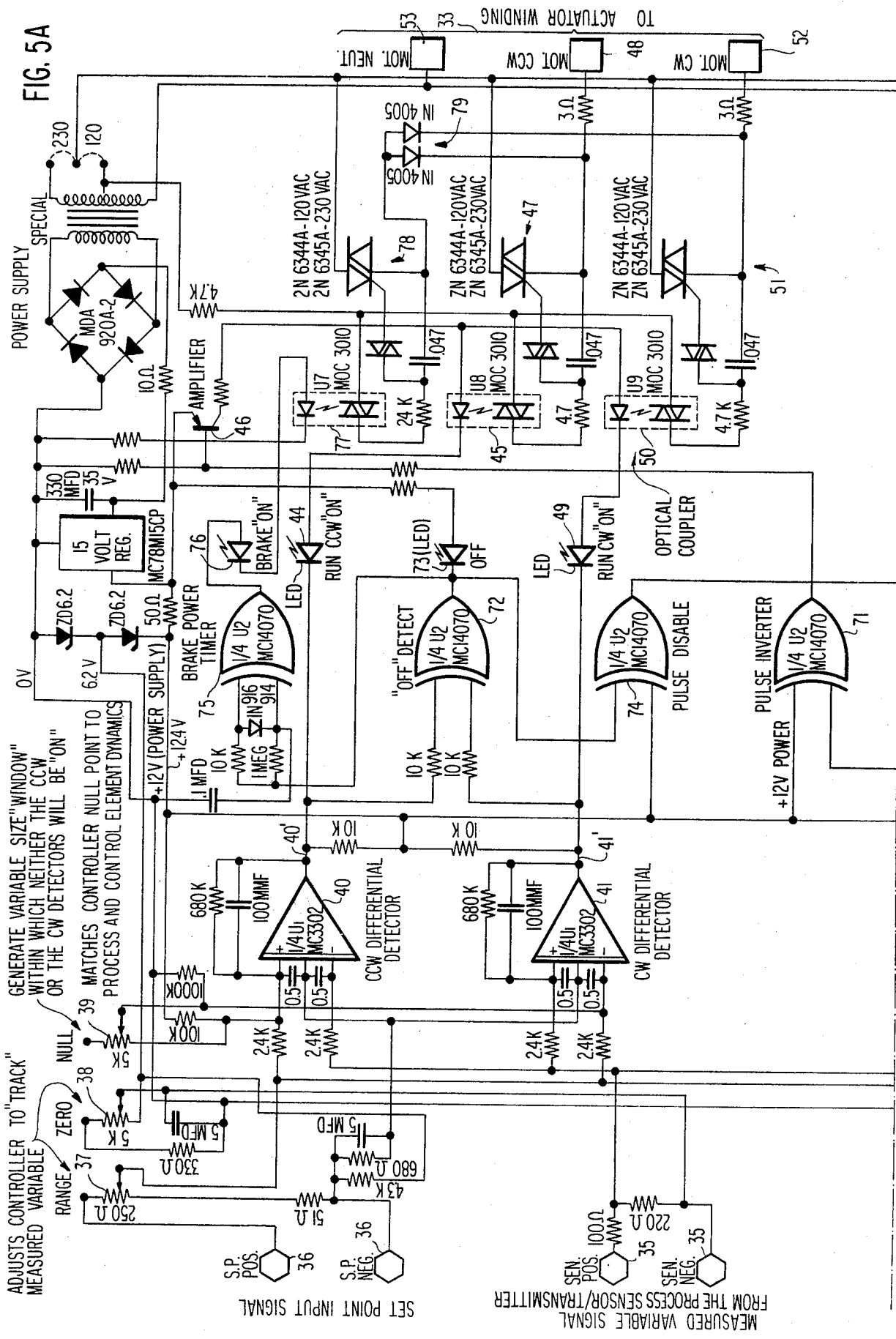
FIGS. 5A and 5B (considered together to form a composite circuit) illustrate an electronic controller constructed in accordance with the present invention.
Figure 5B:
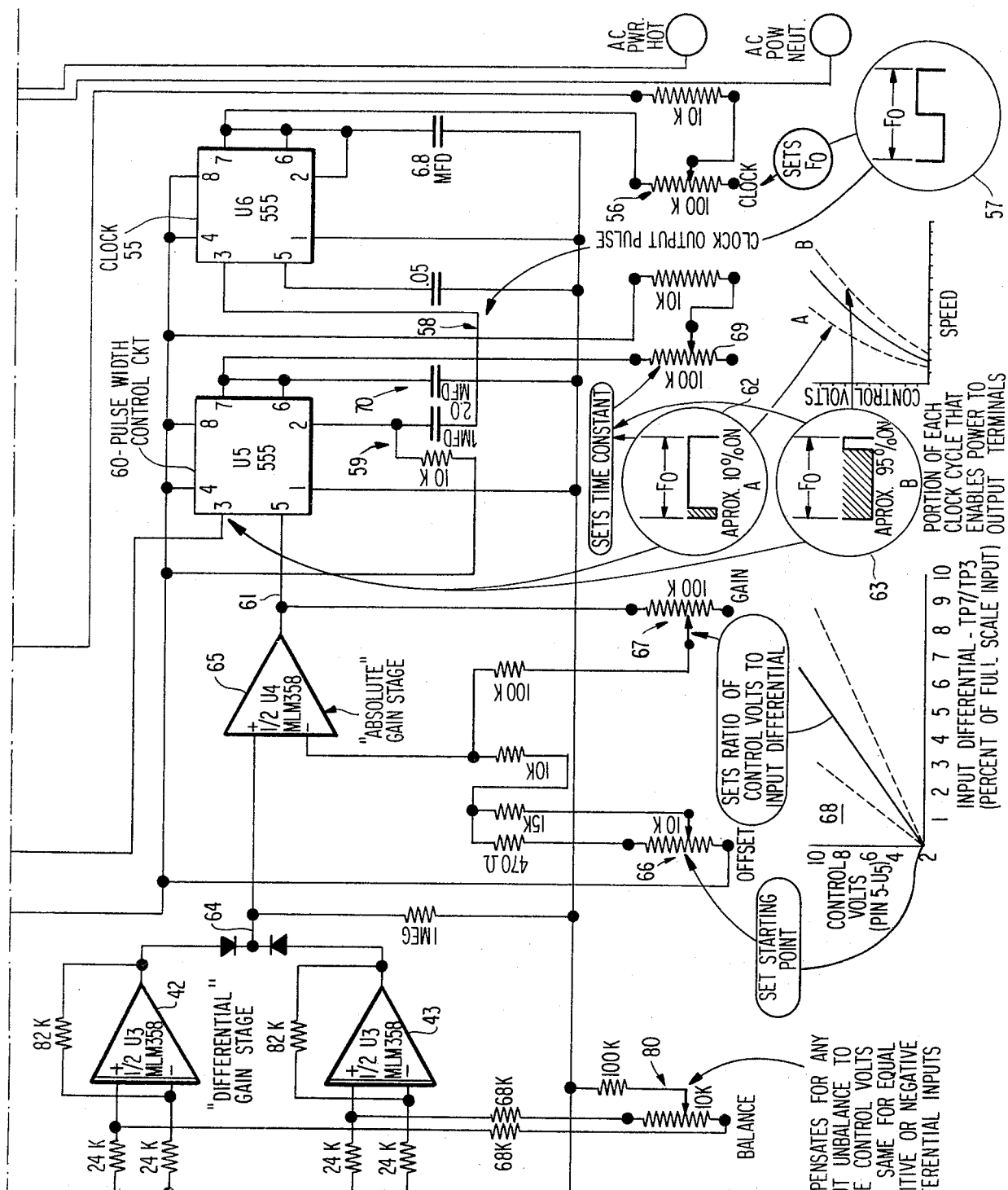

A preferred embodiment of the controller is shown in FIGS. 5A and 5B, which should be considered together. The controller comprises a plurality of logical circuits and components which are commercially available and which are identified by their commercial designations in the drawing figures. The drawings further illustrate how these components are interconnected to one another, and reference should therefore be had to the drawings themselves for these details. The subsequent description will concern itself primarily with the functions of the principal elements forming the controller circuit.

The controller responds to two input signals, namely a measured variable signal which is supplied to a pair of terminals 35 from a process sensor/transmitter such as elements 11′, 12′ of FIG. 2, and the set point input signal which may be supplied to a pair of terminals 36 by an operator, or from an appropriate central controller. In the case of a manual input of the set point signal to terminals 36, an operator would, typically, be monitoring a particular parameter in a process by inspection of gauges or the like, and then, by manipulation of an appropriate input dial would provide a set point signal needed to vary the process parameter as necessary, or to restore the process parameter to a desired value.

The input circuit of the controller includes a range adjustment 37 which can be set by the operator to limit the response of the controller to a particular range of interest of the parameter being monitored. For example, if an input dial used to supply the set point input signal to terminals 36 is capable of supplying signals which could cause an adjustment of the system between 100 and 500 parameter units (e.g., 100°–500° C.), and the particular process being controlled involves only a limited portion of that range, such as 200–400 parameter units, the operator can, by setting range adjustment 37, assure that when the process input signal is at its maximum value, 400 parameter units, the maximum set point signal actually applied to the circuit corresponds to this signal which would achieve 400 parameter units. In addition, the input circuit of the controller includes a zero adjustment 38 which is set to define the lowest parameter value of interest, 200 parameter units, such that by setting the minimum the set point signal actually applied to the circuit corresponds to this signal which would achieve 200 parameter units. The input circuit further includes a null adjustment 39 which establishes a slight differential in the input signals that can be supplied to differential detectors 40 and 41 thereby defining a minimum difference which must be applied to these detectors before the controller determines an error exists between the set point signal 36 and the process signal 35. This adjustment thus tends to assure that the detectors 40, 41 will not be sensitive to small, spurious or transient signal differentials at their inputs, i.e., differentials which are smaller than the differentials which are truly of interest, and limits the response of the controller to those signal differentials which are truly meaningful.

The signals which are supplied to terminals 35, 36 are DC potentials, and these two signals are, through the aforementioned input circuits, used to supply input signals to the two inputs of a counterclockwise differential detector 40 and of a clockwise differential detector 41 which, together, constitute the comparator 26 of FIG. 4, as well as to the inputs of each of a pair of differential gain stages 42, 43 which, together, constitute the differential amplifier 27 of FIG. 4. When there is a differential between the signals supplied to terminals 35, 36, the differential detector 40, 41 operates to determine the polarity or sense of this differential thereby to cause either the clockwise or counterclockwise input of actuator 33 to be energized so as to cause the actuator to move and simultaneously to determine the direction in which it moves. At the same time, the absolute magnitude of the differential between the signals at terminals 35, 36 is determined by differential amplifier 42, 43 which operate to control the rate of movement of the actuator in the specified direction.

More particularly, upon occurrence of a difference between the signals at terminals 35 and 36, one or the other of differential detectors 40, 41 will produce an output signal in dependence upon the sense of that difference. The output of differential detector 40 appears on a line 40' which is coupled through an LED indicator 44 to one side of an optical coupler 45. The other side of optical coupler 45 is controlled through an amplifier 46 from an output which is generated under the control of differential amplifier 42, 43 in a manner which will be described hereinafter. Optical coupler 45 controls the gate of a triac 47 one side of which is connected to the incoming ac power and the other side of which is connected to a terminal 48 for the CCW input of actuator 33.

In analogous fashion, the output of CW differential detector 41 appears on a line 41' which is connected through an LED indicator 49 to an optical coupler 50 which is arranged in a circuit similar to that of optical coupler 45 and which operates to control a triac 51 which in turn energizes a terminal 52 for the CW input of the actuator 33. The actuator includes a common or neutral terminal 53 which is always in circuit.

When the set point input signal at terminals 36 is the same as the sensor signal at terminal 35, neither of detectors 40 or 41 produces an output. When the set point input signal differs from the sensor signal, however, one or the other of the differential detectors 40, 41 will produce an output signal on its associated lines 40', 41' in dependence upon whether the set point input signal is above or below the sensor signal in polarity. The output signals which are produced on either line 40' or 41' are of the same polarity and of the same magnitude, with the magnitude simply being sufficient to drive the subsequent stages in this system, and one or the other of the two indicators 44, 49 will be illuminated to indicate the sense of the discrepancy and, simultaneously, to energize one or the other of the actuator inputs connected to terminals 48, 52 thereby to cause the actuator to move in a direction which, through movement of its associated valve, will correct the measured variable signal at terminals 35 to a signal which corresponds to the set point input signal at terminals 36.

The actuator moves in a series of incremental steps the sizes of which are determined by the instantaneous magnitudes of the error signal during each of a succession of equal time intervals, and which decrease in size step-by-step as the actuator modifies the parameter being sensed toward the valve which is determined by the set point signal. This operation is controlled primarily by the portion of the circuit that are shown on FIG. 5B.

More particularly, the controller includes a clock circuit 55 which is energized from the power supply 47 through an adjustable potentiometer 56. Clock 55 is, in effect, a free running oscillator which produces a clock output having a fixed period $F_0$ as indicated at 57, with the repetition rate and therefore the period of the clock being adjustably set by control 56. The output of clock 55 is supplied via a line 58 through a coupling circuit 59 to a pulse width control circuit 60, to trigger an output from circuit 60 for each clock pulse from clock 55. In addition, the pulse width control circuit is provided with a signal on line 61 which is a function of the absolute magnitude of the error signal produced by a differential between the set point and measured variable signals at the input terminals; and these two inputs to pulse width control circuit 60 cause the pulse width control circuit to produce an output signal which has a width, within the aforementioned clock cycle $F_0$, that is dependent upon the instantaneous magnitude of the error signal which is proportional to the difference between the set point signal at 36 and the process variable signal at 35, and the adjusted resistance value of the pulse width potentiometer 69. The possible varying width output signals are depicted in FIG. 5B as a signal A at 62, showing a condition wherein the pulse output of circuit 60 constitutes only about a 10% portion of the clock cycle, and a signal B at 63 showing a condition wherein the pulse output of circuit 60 constitutes approximately a 95% portion of the clock cycle.

The aforementioned control is achieved by differential amplifier stages 42, 43 whose outputs are connected together at an output line 64 which supplies one input to an absolute amplifier 65. Another input is supplied to amplifier 65 through an offset potentiometer 66, constituting a factory setting, which establishes a minimum output from amplifier 65 thereby to set the minimum time that the actuator will run, i.e., a time which is sufficient for the actuator to take appropriate corrective action with the minimum width pulse that is provided by pulse width control circuit 60. In addition, this input to amplifier 65 includes an adjustable gain control 67 which can be adjusted by an operator in the field to set the ratio between the control voltage output of amplifier 65 to the input differential signal supplied to stages 42, 43, as shown in curves 68. Control 67 is normally adjusted in conjunction with the adjustment of a time constant circuit 69 that is associated with the pulse width control circuit. These two adjustments 67, 69 are normally set by an operator during an initial set-up procedure of the equipment, to control the "on" time of the power pulses which are supplied to the actuator windings as those pulses follow the exponential curve of voltage that charges a capacitor 70 that determines the pulse width output of circuit 60 for a given instantaneous magnitude of signal on line 61.

In practice, during each time interval that is defined by the clock output 57 of clock 55, capacitor 70 charges to a potential which is determined by the output potential from amplifier 65. When capacitor 70 reaches the voltage level equal to the output potential from amplifier 65, the capacitor 70 immediately discharges through internal circuitry to zero potential. The capacitor potential stays at this low value until another clock cycle pulse is received from the clock 55. At this time, the capacitor will again charge up to a value equal to the output potential of amplifier 65. The rate of voltage increase at capacitor 70 is dependent of the resistance value of potentiometer 69. When the magnitude of the error signal at the output of differential amplifier 42, 43 is large, the capacitor 70 charges to a comparatively high value, and pulse width control circuit 60 produces an output pulse of comparatively large width. As the absolute magnitude of the error signal decreases, the capacitor 70 charges to a smaller and smaller value, and the width of the output pulses from control circuit 60 similarly become smaller and smaller. The particular rate in which successive output pulses from control circuit 60 decrease in pulse width is adjusted by the time constant adjustment circuit 69, and these decreases in pulse width preferably constitute an exponential function which substantially matches the time constant of the process being controlled.

In effect, therefore, the pulse width control circuit 60 periodically looks at the output voltage from amplifier 65 and then, when enabled by a pulse from clock 55, produces an output pulse signal whose duration or width is exponentially related to the magnitude of the output from amplifier 65.

Inasmuch as the output of pulse width control circuit 60 is not in proper polarity for use by the components with which it is associated, that output is coupled through a pulse inverter 71 to the aforementioned amplifier 46, and the output of amplifier 46 is then connected to each of the aforementioned optical couplers 45, 50. The energization of each optical coupler, and the energization of the triac with which that optical coupler is associated, is therefore jointly dependent upon the occurrence of an output from one of the differential detectors 40 or 41, and the signal which is supplied to the optical coupler in question from pulse width control circuit 60 via pulse inverter 71 and amplifier 46. As a result, the selected one of the optical couplers provides a gating signal to its associated triac in dependence upon the polarity of the error signal that has been detected, and causes that triac to supply a pulse of energization to its associated actuator input for a time duration which is dependent upon the instantaneous magnitude of the error signal. As the magnitude of the error signal decreases, the time duration of each power pulse similarly decreases, with the result that the actuator moves in a series of incremental steps which decrease in size exponentially during successive time intervals, determined by the clock 56, to match the time constant of the process being controlled.

When the error signal reduces to zero, the outputs on lines 40' and 41' become equal to one another. These two lines are connected to the inputs of an "off" detect circuit 72 which energizes an LED 73 to indicate that there is no longer a discrepancy between the input signals to the controller. The output of the detector circuit 72 is coupled to an input of a pulse disable circuit 74 which removes power from clock 55 thereby to stop the generation of clock pulses whereby pulse width control circuit 60 can no longer produce output pulses to energize the aforementioned optical couplers, triacs, and actuator inputs. At the same time, the output from detector circuit 72 is supplied as an input to a brake power timer circuit 75 which constitutes a one-shot pulse generator that energizes an indicator 76 and also energizes a further optical coupler 77. Optical coupler 77 in turn supplies a gating signal to a triac 78 to supply a pulse through diodes 79 to each of actuator terminals 48 and 52. This pulse, supplied to both the clockwise and counterclockwise inputs of the actuator, acts as a braking pulse which immediately locks the actuator motor and causes it to stop instantaneously.

The circuit also includes a balance potentiometer 80 which is coupled to the inputs of each of differential gain stages 42, 43, and which constitutes a factory adjustment that is used to compensate for any inherent differences in gain which the stages 42, 43 may individually exhibit, thereby to assure that the two stages 42, 43 effectively have the same gain when the system is in operation.

As will be apparent from the foregoing discussion, the actuator of the present invention controls both the direction and speed of the actuator motor, and constantly varies the speed of movement of the actuator until the controller detects that the parameter-dependent error signal produced in the controller has reached zero. The controller does not attempt to define a particular valve position which is needed to achieve such a zero error signal condition, nor does it attempt to move the valve to any specific position; instead, it simply alters the position of the valve in an appropriate direction needed to reduce a parameter-dependent error signal to zero, and causes the actuator and its associated valve to move in that direction at a varying rate which best matches the time constant of the process variable being controlled.

While we have thus described preferred embodiments of the present invention, many variations will be apparent to those skilled in the art. It must therefore be understood that the foregoing description is intended to be illustrative only and not limitative of the present invention, and all such variations and modifications as are in accord with the principles described are meant to fall within the scope of the appended claims.

Having thus described our invention, we claim:

1. An electronic controller for use in a process control system to control the energization of an electrical actuator, said actuator being of the type having a first input which when energized causes said actuator to move in one direction and a second input which when energized causes the actuator to move in the opposite direction, and said actuator being adapted to be connected to a valve operative to vary the flow of a fluid in a controllable process thereby to control the magnitude of a predetermined parameter in said process, said controller comprising input means for receiving first and second electrical signals, said first signal being produced by a process sensor which monitors the existing magnitude of said predetermined parameter in the process being controlled and said first signal being representative of the instantaneous magnitude of the said process parameter, the said second signal being a set signal representative of a desired magnitude of said process parameter, said first and second signals each being substantially independent of the instantaneous positions of said valve and actuator, comparison means coupled to said input means for producing a process parameter error signal when there is a difference between said first and second signals, power supply means for producing a train of power pulses, means responsive to the sense of said process parameter error signal for coupling said power supply means to a selected one of said actuator inputs thereby to determine the direction of movement of said actuator and to cause said actuator to move in said direction in a series of incremental steps during the application of each of said power pulses respectively, and means responsive to the magnitude of said process parameter error signal for controlling the time duration portion of each of said power pulses which energizes said selected actuator input as said actuator repositions said valve incrementally to reduce said process parameter error signal towards zero, said last-named means including means for adjusting the rate of movement of said actuator so that, as said process parameter error signal reduces toward zero, the movement of said actuator substantially matches the time constant of the process being controlled.

2. The electronic controller of claim 1 including means responsive to reduction of said process parameter error signal to zero for applying a pulse to each of said actuator inputs to brake said actuator.

3. The electronic controller of claim 2 wherein each of said first and second signals in a DC potential.

4. The electronic controller of claim 1 wherein said last-named means includes a pulse width control circuit having means for adjusting the extent to which said actuator moves during each of said power pulses to cause said actuator to move in a series of incremental steps the sizes of which vary exponentially to substantially match the time constant of the process being controlled.

5. A controller for use in a process control system of the type including a valve which is adapted to vary the flow of a fluid used in the process thereby to control the magnitude of a predetermined variable parameter in the process, and an actuator for controlling the extent to which said valve is opened and closed, said controller comprising process sensor means for monitoring the magnitude of said variable process parameter and operative to provide a first signal representative of the instantaneous magnitude of said process parameter, means for providing a second signal representative of a desired magnitude of said process parameter, said first and second signals each being substantially independent of the positions of said valve and actuator, comparison means for comparing said first and second signals to provide a process parameter error signal when said first and second signals differ from one another, first control means responsive to the sense of said process parameter error signal for causing said actuator to move in a direction tending to reduce the value of said process parameter error signal toward zero, means for continuously sampling the magnitude of said process parameter error signal during successive substantially equal time intervals, second control means responsive to the magnitude of said process parameter error signal during each of said time intervals for controlling the extent to which said actuator moves during each said time interval, said actuator being jointly responsive to said first and second control means whereby said actuator moves in a given direction and in a series of incremental steps during a succession of substantially equal time intervals with the size of successive ones of said steps reducing as said process parameter error signal reduces in magnitude toward zero, and means for adjusting the extent to which said actuator moves during successive ones of said time intervals to cause the size of said steps to decrease in an exponential function which substantially matches the time constant of the process being controlled.

6. The controller of claim 5 wherein said first and second signals are electrical signals, said actuator comprising an electrical actuator which is adapted to move in one direction when electrically energized in one sense and to move in the opposite direction when electrically energized in the opposite sense, power supply means operative to supply a train of power pulses, said first control means being disposed between said power supply means and said actuator for determining the sense in which said actuator is energized by said pulses, and said second control means comprising means for controlling the portion of each of said power pulses that is coupled to said actuator to energize said actuator.

7. The controller of claim 6 wherein said actuator has two power inputs, the direction of movement of said actuator being dependent upon which of said power inputs is energized, said first control means being operative to control which of said inputs is energized, and means responsive to reduction of said error signal to zero for applying a braking pulse to both of said inputs.

8. The controller of claim 5 wherein said actuator comprises a pneumatic actuator whose operation is controlled by a solenoid operator.

9. The controller of claim 5 wherein said comparison means comprises first and second differential detectors, means for supplying said first and second signals to the inputs of each of said detectors, said first detector being operative to produce an output signal when said error signal has a first sense and said second detector being operative to produce an output signal when said error signal has a second sense opposite to said first sense, a power supply, a plurality of optical couplers disposed between said power supply and different inputs to said actuator respectively, the outputs of said detectors being coupled to said optical couplers to select which of said actuator inputs is to be energized from said power supply thereby to determine the direction of movement of said actuator; said second control means comprising further differential detector means having said first and second signals supplied to its inputs, clock means for producing clock pulses, a pulse width control circuit coupled to the output of said further differential detector means and to said clock means for producing a train of control pulses whose width varies as a function of the magnitude of the output of said further differential detector means, and means for coupling said variable width control pulses to said optical couplers for controlling the time durations during which said selected actuator inputs are energized from said power supply.

10. The controller of claim 9 including pulse generator means coupled to the outputs of said first and second detectors and responsive to reduction of said error signal substantially to zero for applying an electrical pulse to a plurality of said actuator windings thereby to brake said actuator.

11. The controller of claim 9 including means for adjusting the period of said clock pulses.

12. The controller of claim 9 wherein said means for adjusting the extent to which said actuator moves during successive ones of said time intervals includes time constant adjustment means for controlling the relationship between the width variations of said train of control pulses and variations in the output of said further detector means, whereby the sizes of said incremental steps of said actuator are varied exponentially to substantially match the time constant of the process being controlled.

13. The controller of claim 9 including amplifier means between the output of said further differential detector means and said pulse width control circuit, and gain control means coupled to said amplifier means.

14. The controller of claim 9 including means responsive to reduction of said error signal to zero for deactivating said clock means.

* * * * *